(12) United States Patent  
Niemiec

(10) Patent No.: US 7,445,544 B2  
(45) Date of Patent: Nov. 4, 2008

(54) BACON HANGER

(75) Inventor: James P. Niemiec, Orland Hills, IL (US)

(73) Assignee: Beacon, Inc., Alsip, IL (US)

( * ) Notice: Subject to any disclaimer, the term of this patent is extended or adjusted under 35 U.S.C. 154(b) by 731 days.

(21) Appl. No.: 11/070,128

(22) Filed: Mar. 1, 2005

(65) Prior Publication Data

US 2006/0199488 A1 Sep. 7, 2006

(51) Int. Cl.
*A22C 18/00* (2006.01)

(52) U.S. Cl. ..................................... 452/193
(58) Field of Classification Search ....................... None
See application file for complete search history.

(56) References Cited

U.S. PATENT DOCUMENTS

| 935,171 | A | 9/1909 | Stark et al. |
| 974,200 | A | 11/1910 | Skewer |
| 979,945 | A | 12/1910 | Harnischfeger |
| 998,286 | A | 7/1911 | Fisher |
| 1,006,007 | A | 10/1911 | Rispel |
| 1,058,387 | A | 4/1913 | Rastman |
| 1,794,304 | A | 2/1931 | Hans Koch |
| 1,825,879 | A | 10/1931 | Louthian |
| 1,870,729 | A | 8/1932 | Hulseberg |
| 1,915,293 | A | 6/1933 | Covey |
| 1,936,380 | A | 11/1933 | Lalumier et al. |
| 1,967,870 | A | 7/1934 | Covey |
| 2,025,291 | A | * | 12/1935 | Linney | ...................... 223/98 |
| 2,412,233 | A | 12/1946 | Tominello |
| 3,090,990 | A | 5/1963 | Graper |
| 3,887,079 | A | * | 6/1975 | Crew | ........................ 211/118 |
| 4,029,212 | A | * | 6/1977 | Uadiski | ...................... 211/113 |
| 4,172,305 | A | 10/1979 | Henebry et al. |
| 4,278,177 | A | * | 7/1981 | Fahmi | ......................... 211/116 |
| 4,863,043 | A | * | 9/1989 | Bowen | ...................... 211/113 |
| 5,423,721 | A | 6/1995 | Roush et al. |
| 5,848,716 | A | * | 12/1998 | Waranius | ...................... 211/189 |
| 5,862,924 | A | * | 1/1999 | Dumont | ........................ 211/85.7 |
| 5,938,522 | A | 8/1999 | Jagusch et al. |
| 6,152,313 | A | * | 11/2000 | Klein et al. | .................. 211/113 |
| 6,196,396 | B1 | * | 3/2001 | Bennett | ...................... 211/85.3 |
| 6,398,086 | B1 | * | 6/2002 | Bennett | ........................ 223/87 |
| 6,506,108 | B1 | 1/2003 | Jagusch |

* cited by examiner

*Primary Examiner*—Thomas Price
(74) *Attorney, Agent, or Firm*—McAndrews, Held & Malloy, Ltd.

(57) ABSTRACT

A hanger designed for supporting pork bellies during handling and processing into slabs of bacon characterized by support member, and a generally rectangular base frame with a top bar and a bottom bar, and a series of generally L-shaped prong members attached to the base frame and defining a prong assembly extending laterally from the base frame. The prong members may be at different elevations to ensure engagement with the cutaneous trunci muscle. The hanger structure may be stabilized by a generally vertical rod connecting the base frame and the support member.

14 Claims, 3 Drawing Sheets

BACON HANGER

CROSS-REFERENCE TO RELATED APPLICATION

None.

STATEMENT REGARDING FEDERALLY SPONSORED RESEARCH OR DEVELOPMENT

None.

BACKGROUND OF THE INVENTION

This invention relates to equipment for supporting and handling articles, particularly meat products, in manufacturing and for supporting pork bellies during processing to form slabs of bacon.

In the slaughtering or butchering of hogs the various portions or cuts into which the animal carcass is divided are prepared for marketing by meat packers and processors according to the type of cut and the form in which it is desired to present it to the consumer. Generally, cuts known as pork bellies are processed by suspending them for a predetermined time in a processing area, such as a smoke house, or similar curing area, where they are converted into slabs of bacon which may be supplied to the consumer in a solid piece or cut into slices after sizing and packaged to provide the familiar sliced bacon package.

In the conventional slaughtering and processing operation, pork bellies are transported from the receiving or cutting area to an area where they are located onto bacon hangers, which serve to support the bellies on a tree or rack while they are being processed. When the processing or curing is completed, the bacon slabs are removed from the hangers enabling reuse of the latter.

The bacon hangers which have been provided heretofore have been formed with pointed prongs or teeth arranged as in a comb on a common plane and mounted on a frame depending from a bracket member which is shaped or otherwise formed for engaging an overhead rail, track bar, smokestick or the like. Generally, the hangers have been constructed so that the hanger teeth or prongs can be readily inserted into the relatively soft area along the top ends (typically called the brisket end) of the bellies by pressing the teeth into the same. Some portion of the frame may serve as a handle for gripping the hanger while guiding the teeth into the meat. The end points of pointed prongs of the previous bacon hangers were generally in the same plane.

The top end of the pork bellies consists mostly of fat and a muscle called the cutaneous trunci (CT) muscle. This muscle extends through a substantial part of the length of the pork belly. The CT muscle is relatively small at the top portion of the belly becoming larger as it extends down the length of the belly. The amount of the CT muscle that appears in the final sliced product determines whether or not the product meets a lean specification. Most often, the prongs of the present hangers are arranged in a common plane such that when they are inserted into the top end of the pork belly they fail to engage the CT muscle, engaging mostly fat. Because the CT muscle extends for most of the length of the pork belly and is stronger and more denser than fat, it is desirable that at least one pair of prongs penetrate the CT muscle thus providing support for the entire belly. Additionally, during processing, the CT muscle shrinks affecting the amount of muscle in the final product, thus affecting yield. Without engaging the supporting CT muscle, the CT muscle shrinks and the pork bellies elongate on the hangers as they are processed. This elongation is undesirable because it causes a higher density of fat in the top section. This higher density of fat causes this top section to fail to meet the lean specifications established for the final processed product, resulting in a section with minimal or no commercial value, therefore, reducing product yield. Further, the elongation of the pork bellies on the hanger causes physical clearance problems as the bellies move along during processing.

For the foregoing reasons, there is a need for a hanger such that the device is not disposed to the disadvantages of the prior art.

SUMMARY OF THE INVENTION

It is a general object of the present invention to provide an improved structure for use in handling cuts of meat, particularly pork bellies, following slaughtering operations and during subsequent handling and processing operations.

A further object of the invention is to provide an improved hanger structure of the type having a plurality of spaced prongs for insertion into pork bellies and removal from pork bellies or similar cuts so as to support the same during handling and/or processing wherein the hanger may be provided with a gripping area arranged relative to the prongs.

Still another object of the invention is to provide an improved bacon hanger structure having meat penetrating prongs arranged to extend in planes at an angle to the plane of an elongate support frame, with the frame being adapted to be disposed in a substantially vertical plane and the prongs constituting end portions of leg formations on rod members which are bent into "U" shape and which are part of the vertically disposed support frame or which are secured to the support frame by the portions of the leg formations which adjoin the bight forming portion of the "U" shape.

It is a more specific object of the invention to provide a bacon hanger that is specially adapted to ensure that the CT muscle is purposefully engaged by at least one pair of prongs to maintain the CT muscle in the upper portion of the pork belly, reduce CT muscle shrinkage and subsequent pork belly elongation during processing and transportation of the meat thus resulting in higher yield from the pork belly or meat product.

Another object of the invention to provide a new and improved hanger structure that is especially adapted for suspending pork bellies and removal of the hanger from the bellies so as to facilitate handling, storage, retrieval and processing to convert the bellies into slabs of bacon.

The invention as disclosed and claimed herein comprises a typical bacon hanger which will generally include horizontal support bar members adapted to be disposed in generally vertical planes, a plurality of spaced article engaging prongs extending generally normal to the planes of the frame having weld positions under compression while under stress caused by the weight of the belly and/or stress caused by extracting the hanger prongs from the processed pork belly, at least one pair of prongs disposed in a plane at a different elevation than other prongs and a stabilizing member connected between the support member and the support frame. Examples of typical bacon hangers are disclosed in U.S. Pat. Nos. 5,938,522, 6,506,108, and U.S. patent application Ser. No. 10/965,427, which are hereby incorporated by reference.

The aforesaid and other objects and advantages of the invention will become more apparent upon consideration of the preferred form of the hanger structure which is illustrated in the accompanying drawings wherein like parts are identified by the same numerals throughout the views.

DESCRIPTION OF THE PREFERRED EMBODIMENT OF THE INVENTION

Figure 1:
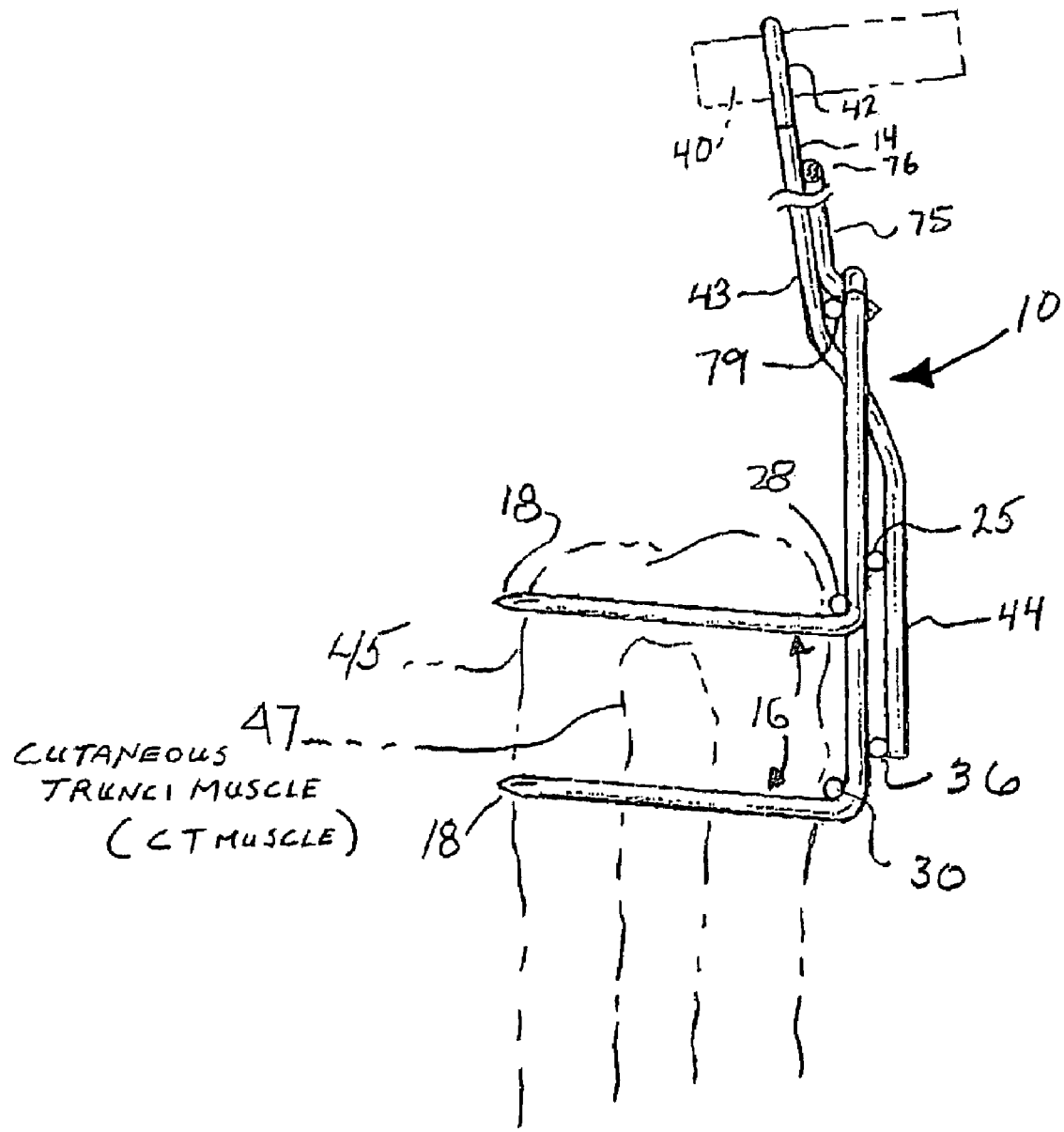
FIG. 1 is an end view of a hanger structure which is particularly adapted for use in suspending cuts of meat in a processing area with the hanger being shown in the position it will assume when mounted on an overhead support bar or rack member and showing the spaced relationship between the prongs at various elevations.

As illustrated in the drawings, hanger 10 is designed particularly for use in suspending pork bellies for transportation and during processing or curing, such as a smoke house, cooking oven, curing or cooling area. The hanger is designed so that it may be hung on a tree, on a truck, rail or rack and moved to or through the processing area or system where it may be supported in the same manner or carried on a conveyor, or the like, during the processing and subsequent handling.

To the extent that the hangers depicted in the accompanying figures retain common or comparable elements from figure to figure, the same reference numerals will be applied to such elements, which will not always be separately explained for such figure.

Figure 2:
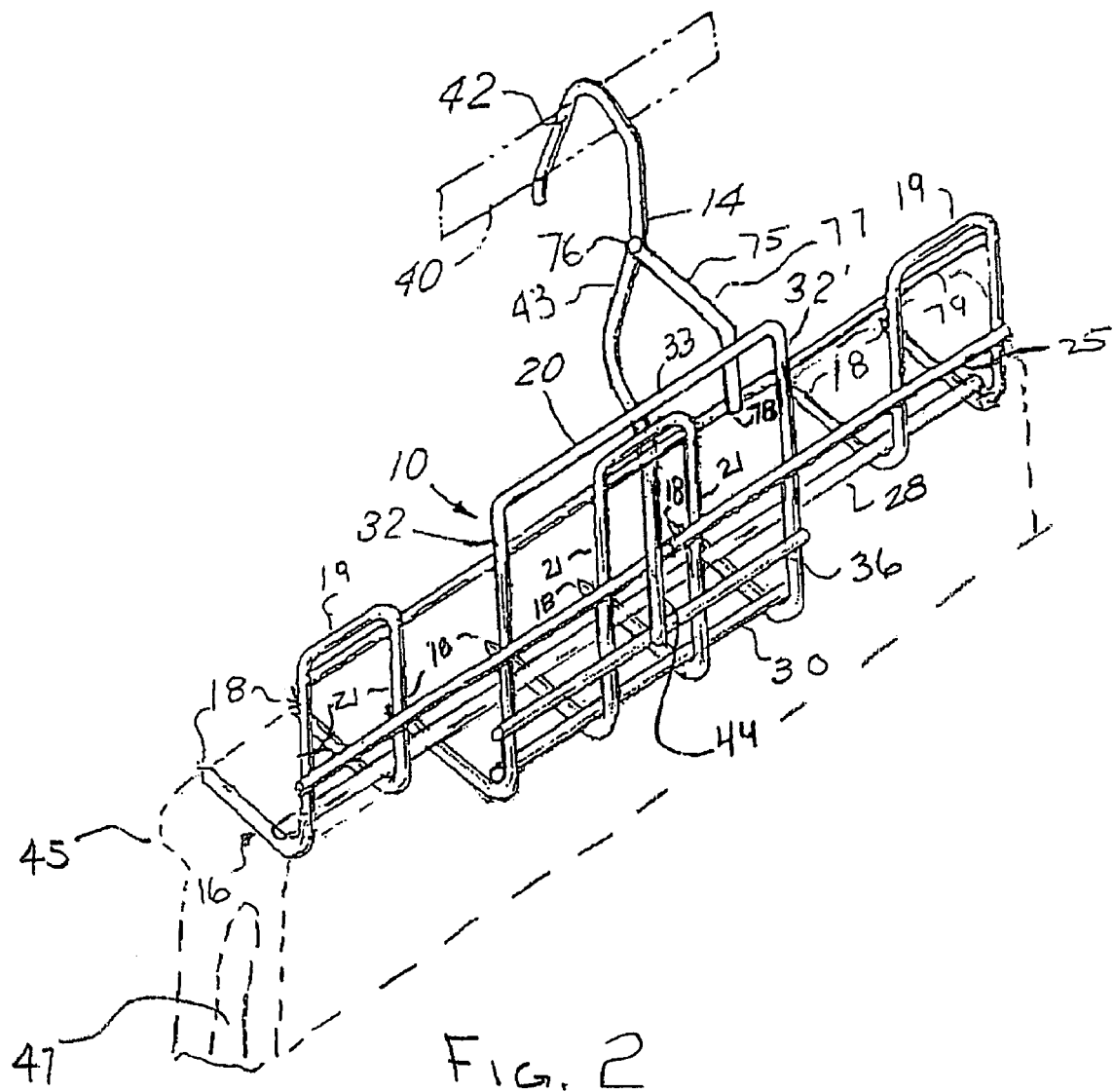
FIG. 2 is a perspective view of the hanger structure of FIG. 1 showing the spaced relationship between the spaced crossbars and the prongs.

Referring to FIGS. 1 and 2, hanger 10 comprises a support structure made up of a top support frame bar 79, backside cross bar 25, lower transverse bar 28, a backside intermediate bar 36, and bottom bar 30. Cross bar 25, bar 28, bottom bar 30 and intermediate bar 36 are in spaced parallel relation below top bar 79 so as to form support for prong assembly 16 of meat engaging prongs 18 which extend in a plurality of planes generally normal to the support structure.

Member 20 may be formed by bending a section or length of bar or rod material into a U-shaped configuration with spaced apart leg formations 32, 32' which are further bent to provide a pair of prongs 18 and the assembly is mounted on the frame bars or rods 25 and 79. Specifically, leg formations 32, 32' are attached to the backside of top frame bar 79, prong side of the crossbar 25, and prong side of intermediate bar 36. Bottom bar 30 is attached where the leg formations 32, 32' transition from vertical to generally horizontal to form prongs 18. The bight portion 33 of member 20 is spaced above the top frame bar 79. In some embodiments, member 20 may be spaced a sufficient distance above top bar 79 to accommodate fingers in grasping the same. The leg formations 32, 32' may also be bent at intermediate points to provide the desired distance between the resulting prongs.

On either side and in between the two leg formations 32, 32' are prongs 18 formed in pairs. The two pair of prongs 18 on the outside of leg formations 32, 32' are attached to the backside of top frame bar 79 and prong side of crossbar 25. The pair of prongs 18 inside of leg formations 32, 32' are attached to top frame bar 79, crossbar 25, intermediate bar 36, and bottom bar 30. Each pair of prongs 18 is formed from a section or length of rod or bar stock by bending it into U-shape to provide a bight portion 19 and spaced parallel leg formations 21. It is contemplated that parallel leg formations 21 may be of different lengths. Leg formations 21 are further bent intermediate to their ends to provide a pair of prongs 18. Prongs 18 extend in a plane at an angle to the plane of the balance of the member. The U-shaped members on either side of leg formations 32, 32' of member 20 are secured on frame bar 79 so that portions of leg formations 21 adjoining bight portion 19 span the area from top frame bar 79 and crossbar 25. U-shaped member between the leg formations 32, 32' of member 20 is secured on frame bar 79 so that portions of the leg formations 21 adjoining bight portion 19 span the area from the top frame bar 79 and bottom bar 30.

As will be well understood by those skilled in the art, the welds attaching leg formations 21 to the plurality of support structure bar members are under compression when hanger 10 is engaged in supporting a pork belly or when hanger 10 is being extracted from a pork belly.

Transverse bar 28 is attached to the prong side of leg formations 21 of the U-shaped members outside of leg formations 32, 32' of member 20. Bar 28 is attached at or near the point where leg formations 21 of the U-shaped members bend from vertical to horizontal.

Intermediate bar 36 is preferably spaced in a parallel relation below crossbar 25 and above bottom bar 30 and is attached to the backside of leg formations 32, 32' and leg formations 21 of the intermediate U-shaped member. Bottom bar member 30 is attached to the prong side of leg formations 32, 32' and the U-shaped members that form prongs 18 that is in between leg formations 32, 32' at or near the point where the leg formations 32, 32' and the U-shaped members leg formation 21 bend from the vertical to the generally horizontal plane.

Hook-forming bracket 14, which is provided to mount to support top frame bar 79, crossbar 25, and intermediate bar 36 from a rack or support bar as indicated in phantom line at 40, is formed from a length or section of bar or rod stock which is best shown to provide a downwardly opening hook 42 at the top and a straight terminal end section 44 for spanning the space between the top bar 79 and crossbar 25 and ending with intermediate bar 36. Intermediate portion 43 is bent to position the hook 42 in a vertical plane substantially parallel to the plane of the frame bar 79 for better balance in handling. Intermediate portion 43 is preferably attached to the prong side of bar 79. End section 44 is preferably attached to the backside of crossbar 25 and intermediate bar 36. End section 44 may include a lateral offset.

Stabilizing member 75, which is provided to transmit the forces from hook-forming bracket 14 to frame bar 79 and member 20, is preferably formed from a length or section of bar or rod stock. Stabilizing member 75 preferably attaches on the backside of hanger 10. Stabilizing member 75 has a first end 76, an intermediate portion 77 and a second end 78. The first end 76 of the stabilizing member 75 is preferably attached to the backside of intermediate portion 43 of the hook forming bracket 14 at a location above the point where the intermediate portion 43 is attached to bight portion 33 of member 20. Stabilizing member 75 then extends in a downwardly direction away from opening hook 42. Intermediate portion 77 of stabilizing member 75 preferably attaches to the prong side of bright portion 33 of member 20. Stabilizing member 75 continues in a downwardly direction away from the opening hook 42 and second end 78 of the stabilizing member 75 preferably attaches to the top frame bar 79 on the backside. In sum, those skilled in the art will understand that the stabilizing member may be utilized with any prior art bacon hanger configuration.

In the form shown in FIG. 1, the angle of the prongs 18 relative to the angle of the hook 42 is so determined to have the prongs in a plane at a slight angle above horizontal. When a belly is on the hanger this eliminates the possibility of the belly slipping off the hanger. It is contemplated that individual pairs of prongs 18 may be at different elevations in relationship to each other. Further, the elevation of prongs 18 of leg formations 32, 32' of member 20 and prongs 18 of the intermediate U-shaped member may be on a common plane lower than the plane of prongs 18 of the outside U-shaped members. It is contemplated that prongs 18 spaced below the common plane of the other prongs 18 will allow engagement of the cutaneous trunci muscle 47 by the lower disposed prongs.

Figure 3:
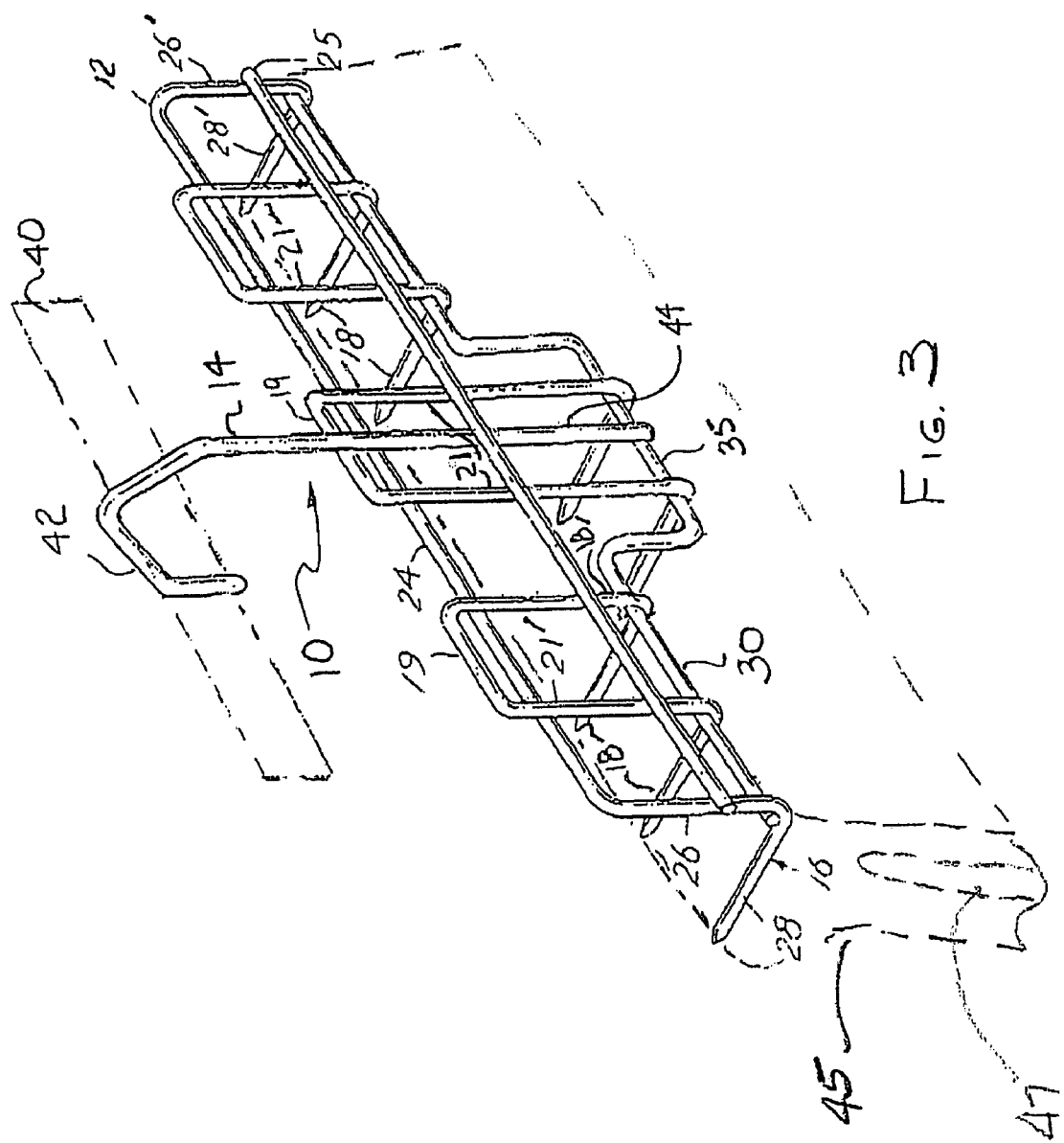
FIG. 3 is a perspective view of another embodiment of the hanger structure of the present invention.

FIG. 3 shows a second embodiment of the present invention. Hanger 10 of the present invention comprises an elongate supporting frame 12 which is secured in vertically disposed depending relation on a hook-forming bracket 14 and carries a prong assembly 16 of meat engaging prongs 18, which extend in a plurality of planes in a generally normal direction from one side of the vertical support frame 12. Support frame 12 includes a crossbar 25 that is attached to the backside of leg formations 26, 26' preferably below their midpoint and a bottom bar member 30 that is attached to the front side of the leg formations 26, 26' at their lower end.

The elongate support frame 12 may be formed by bending a length of rod stock into a U-shape so as to form a relatively long bight portion, which serves as top bar 24 support frame 12, and leg formations 26, 26' which are further bent intermediate of their ends so as to provide the end prongs 28, 28' prong assembly 16. End prongs 28, 28' extend in a plane at an angle slightly less than normal to the plane of support frame 12. Crossbar 25 and bottom bar member 30 connect the two leg formations 26, 26' and are in spaced parallel relation below top bar 24 so as to form a frame support for meat engaging prong assembly 16.

Prongs 18 intermediate the two end prongs 28, 28' are formed in pairs and attached to support frame 12. Each pair thereof is formed from a section or length of rod or bar stock by bending it into U-shape to provide a bight portion 19 and spaced parallel leg formations 21. Leg formations 21 may be different lengths depending on the particular U-shaped prong 18. The leg formations 21 are further bent intermediate of their ends to provide a pair of prongs 18. Prongs 18 extend in a plurality of planes at an angle to the plane of the balance of the member which is secured on support frame 12 so that portions of the legs formations 21 adjoining bight portion 19 span the area from the top bar 24, crossbar 25, and bottom bar member 30 of support frame 12. Leg formations 21 are preferably attached to the backside of the top bar 24, the prong side of crossbar 25, and the backside of the bottom bar member 30 enabling a structure in which the welds of the legs of the support frame 12 and leg formations 21 of the prong assembly are under compression while supporting the weight of pork belly 45 or when hanger 10 is being extracted from the belly 45.

The bottom-bar member 30 is welded to the prong side of leg formations 26, 26' and the U-shaped members that form the remaining prongs 18. The bottom bar member 30 is welded at or near the point where the leg formations 26, 26 and the U-shaped members bend from the vertical to the horizontal. Bottom bar 30 includes an offset 35, which extends in a downward vertical direction away from crossbar 25 and generally parallel to the plane of the base frame. At least one of U-shaped members leg formations 21 extends downward to engage bottom bar 30 at offset 35 and leg formations 21 are welded to bottom bar 30 at offset 35 where the U-shaped member bends from vertical to horizontal. It will be understood that prongs 18 extending from leg formations 21 of any U-shaped member attached to bottom bar 30 at offset 35 will generally be at an elevation below other prongs 18.

The hook-forming bracket 14, which is provided to mount the support frame 12 on a rack or support bar, indicated in phantom line at 40, is formed from a length or section of bar or rod stock which is best shown to provide a downwardly opening hook 42 at the top and a formed terminal end section 44 for spanning the space between bight portion 19 of U-shaped prong 18 and offset 35 of bottom bar 30. End section 44 is preferably attached to the prong side of crossbar 25. Thus, all weld intersections are preferably under compression while supporting the weight of the pork belly 45.

The several elements of the hanger structure 10 in the forms illustrated are fabricated from lengths of metal rod material, of suitable gauge, which are bent as shown and joined or connected by welding, or secured to each other in a similar manner. Preferably, the rod or bar material will be stainless steel to afford the most desirable sanitation before use.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

What is claimed is:

1. A hanger structure adapted for suspending a meat product during processing comprising: a support member adapted to engage an overhead structure and having a prong-side; a base frame being formed by a plurality of bar members depending from the support member, the base frame having a prong-side and a backside; a plurality of members in the form of pointed prongs adapted to be pressed into engagement with the meat product, disposed at a plurality of elevations generally normal to and extending from the prong-side of the base frame; a stabilizing member attaching the support member to the base frame; the plurality of bar members in the base frame having at least a first bar member having first ends and generally parallel to a second bar member, the second bar member having second ends, an intermediate bar member having third ends and a bottom bar having fourth ends and a transverse bar having fifth ends; and the prongs are arranged in pairs and the pairs of prongs are formed as terminal end sections of U-shaped rod members which have leg portions constituting a part of the base frame and are attached to the base frame with the terminal end sections being bent at an angle to the plane of the base frame whereby the prongs extend at a plurality of elevations with relation to each other.

2. A hanger structure as set forth in claim 1 wherein the attachments of the U-shaped rod members leg portions to the base frame are under compression while supporting a weight of the meat product.

3. A hanger structure as set forth in claim 1 wherein the bottom bar member is spaced below and generally parallel to the second bar member.

4. A hanger structure as set forth in claim 1 wherein the fourth ends of the bottom bar are attached to the prong side the U-shaped rod members between the leg portions and the terminal end section.

5. A hanger structure as set forth in claim 1 wherein the intermediate bar third ends are attached to the backside leg portions of the U-shaped members.

6. A hanger structure adapted for suspending a meat product during processing, the hanger structure comprising: a support member, an elongate base frame adapted to be positioned in a generally vertical plane, the base frame having a prong side and a backside, the base frame being formed by a first bar member and a second bar member, and a middle bar member, the first bar member having an inverted U-shaped configuration and having a top bight forming portion and an opposed side first bar leg members, the bight forming portion being spaced and generally parallel to the second bar member, the second bar member having first ends, the first ends connected to the prong side of the first bar leg members such that the second bar member is in spaced relation to the first bar member, the middle bar member is in spaced relation to the first bar member, the middle bar member having second ends, the second ends connect to the first bar leg members such that the middle bar member is in spaced relation to the bight forming portion of the first bar member and the second bar member, a plurality of members in the form of pointed prongs adapted to be pressed into engagement with the meat product, which prongs are at a plurality of elevations extending laterally from the prong side of the base frame, and the second bar member having an offset extending in a vertical plane generally parallel to the plane of the base frame.

7. A hanger structure as set forth in claim 6 wherein the prong members are arranged in pairs and the pairs of prongs are formed as a terminal end sections of U-shaped rod members which have leg portions constituting a part of the base frame and are attached to the base frame with the terminal end sections being bent at an angle to the plane of the base frame whereby the prongs extend in a common lateral plane.

8. A hanger structure as set forth in claim 7 wherein the attachments of the leg portions of the U-shaped rod members to the base frame are under compression while supporting a weight of the meat product.

9. A hanger structure as set forth in claim 7 wherein the first ends of the second bar member are connected to prong side of the first bar leg members of the first bar member and the second bar member is connected to the prong side of the U-shaped rod members at points between the first ends.

10. A hanger structure as set forth in claim 7 wherein the second ends of the middle bar member are connected to the backside of the leg members of the first bar member and to the backside of legs portions of the U-shaped rod members.

11. A hanger structure as set forth in claim 6 wherein the first bar leg members of the U-shaped first bar rod member on the base frame have terminal end portions shaped so as to form pointed prongs.

12. A hanger structure as set forth in claim 6 wherein the support member is a hook-forming bracket that extends above the base frame and is connected to the first bar member and the second bar member and includes a downwardly opening hook.

13. A hanger structure as set forth claim 6 wherein the offset of the second bar member extends in a downward direction from the middle bar member between the first ends of the second bar member.

14. A hanger structure as set for the in claim 13 wherein at least one pair of prongs is attached to the offset of the second bar member.

* * * * *